March 5, 1963   D. A. CHURCH   3,080,138
BALLOON END FITTING WITH BUILT-IN DIFFUSER
Filed June 21, 1961

INVENTOR.
DAVID A. CHURCH
BY Allen M. Sutton
ATTORNEY

р

United States Patent Office 3,080,138
Patented Mar. 5, 1963

3,080,138
BALLOON END FITTING WITH BUILT-IN DIFFUSER
David A. Church, Coon Rapids, Minn., assignor to General Mills, Inc., a corporation of Delaware
Filed June 21, 1961, Ser. No. 118,735
3 Claims. (Cl. 244—31)

The present invention relates generally to balloons and more specifically to an improved end fitting for balloons.

One type of balloon that has received acceptance in the balloon field is one formed of a tubular plastic material cut to a desired length and seamed or closed off at its ends to complete the balloon. The balloon is inflated with a lifting gas sufficient to carry it aloft to a prescribed altitude. Such balloons are constructed of lightweight plastic or other thin material and, while the material is impervious to gas, it is very susceptible to rupture during inflation. Inflating gas, when admitted to a balloon, is often under extremely high pressure, and if admitted directly against the material of the balloon, may cause a rupture in the material. For the latter reason, diffusers have been employed during inflation to diffuse the gas and prevent it from impinging on small areas on the surface of the balloon.

Generally speaking, however, such diffusers, even though they diffuse the gas to a certain degree, still allow the gas to be directed against the inside surface of the balloon. Thus, when inflating a balloon of any magnitude, the gas is still somewhat concentrated on spots of the material for a prolonged period of time, and such concentrations can conceivably cause a rupture in the balloon.

It is, therefore, one object of the invention to provide an improved end fitting for a balloon in which gas admitted to the balloon is diffused substantially within the area of the interior of the fitting.

A further object of the invention is to provide an improved end fitting for a balloon in which means are provided integral with the fitting for diffusing an inflating gas in the general area of the internal surfaces of the fitting, and preventing the direct flow of the gas against the balloon material.

The various objects are attained in one embodiment of the invention comprising a cup-shaped end closure member and a diffuser mounted therein having a central bore communicating with the exterior through the bottom of the end closure member. The diffuser is closed at its upper end, which terminates below the top of the end closure member, and is provided with a plurality of radially and axially spaced apertures to direct an inflating gas against the interior wall of the end closure member.

Figure 1:
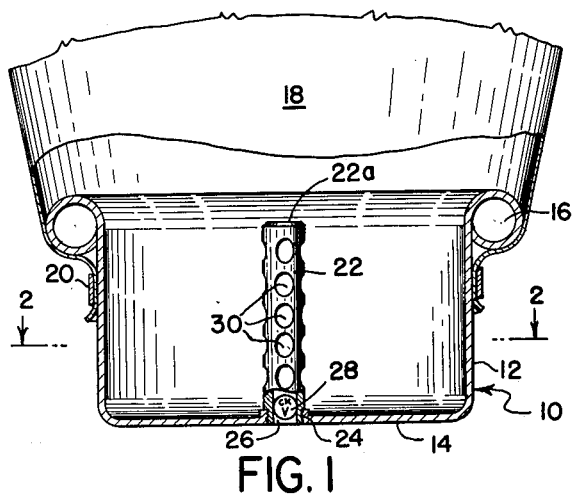
Figure 2:
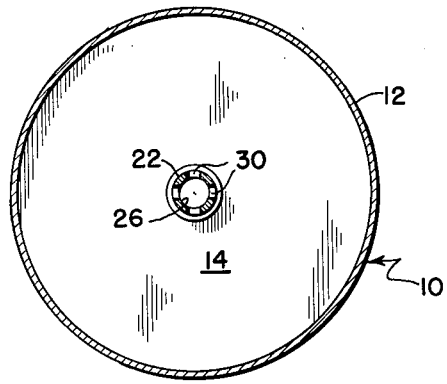

Other objects and advantages will become apparent from the following description, taken in conjunction with the accompanying drawing, in which:

FIGURE 1 is a vertical sectional view with a portion broken away illustrating an embodiment of the invention; and FIG. 2 is a sectional view taken along the line 2—2 of FIG. 1.

As seen from the drawing, an end fitting, which is indicated generally by the numeral 10, includes an upstanding side wall 12 that surrounds a substantially planar bottom 14 and terminates at its upper end in an annular balloon mounting ring or flange 16. A balloon 18 is secured to the side wall 12 of the end fitting by conventional means such as a banding ring 20.

A diffuser body 22 is provided inside the end fitting 10 and is threaded into a threaded opening 24 in the bottom of the end closure member. The diffuser is elongated in shape and includes a central axial bore or opening 26 that is in communication with the exterior of the end closure member through its bottom 14. A conventional check or inlet valve 28 may be provided in the bore 26 through which an inflating gas can be admitted to the interior of the end fitting 10 and hence into the balloon 18. The bore 26 does not extend entirely through the diffuser 22 but terminates short of its upper end 22A.

As shown in the drawing, the upper end 22A of the diffuser is below the uppermost surface of the annular ring 16, and a plurality of apertures 30 are provided in the diffuser which communicate with the central bore 26. The apertures 30 are spaced apart both radially and axially on the diffuser 22 and serve to direct the flow of an inflating gas against the internal walls of the end fitting 10. Thus, an inflating gas normally does not come into contact with the walls of the balloon 18 until it has been greatly diffused by contact with the internal surfaces of the end fitting, and rupture of the thin balloon walls is substantially eliminated While the balloon end fixture 10 is shown as substantially round, it will be realized that the particular shape of the end fitting is dependent upon the requirements of the balloon, and that other shapes and modifications are feasible within the scope of the invention. The latter is likewise true of the shape and size of the diffuser, which may be influenced by particular requirements of the balloon. It may also be desirable in some instances to provide a greater or lesser number of communicating apertures or openings for the entrance and diffusion of gas and it may be necessary to locate the diffuser in a location within the end fitting other than as shown in the drawing. Additionally, it could be desirable in some instances to locate the axes of the apertures 30 angularly with respect to the axial bore 26, in order to facilitate a particular need.

Although a particular embodiment of the invention has been illustrated and described, many modifications may be made by one skilled in the art without departing from the spirit of the invention.

I claim:

1. In an end fitting for a balloon, the combination comprising a cup-shaped end closure member, and a diffuser mounted in said end closure member and communicating with the exterior of said end closure member through a wall thereof, said diffuser having a plurality of openings constructed to direct the total flow of a gas therethrough solely against the interior of said end closure member.

2. In an end fitting for a balloon, the combination comprising a cup-shaped end closure member, and a diffuser including an elongated diffuser body having an opening extending axially into said body, thread means integral with said diffuser body for securing said diffuser body within said end closure member with said opening in registration with a threaded gas entry port in said end closure member, an inflation valve in said opening for admitting a gas through said opening, said diffuser body having a plurality of apertures radially and axially spaced apart, said apertures communicating with said opening and the interior of said end closure member for directing all the gas passed therethrough solely against the interior of said end closure member.

3. An end fitting for a balloon comprising, in combination, an end closure member having a bottom and an upstanding sidewall surrounding said bottom, said sidewall terminating in a balloon mounting ring adjacent an open end and opposite said bottom, an elongated diffuser body inside said end closure member and mounted in the bottom thereof, said diffuser body having a bore extending partially into said body and terminating short of the open end of said end closure member, said bore including an inflation valve for filling a balloon, said diffuser body having a plurality of openings radially and axially spaced apart along the length of, and in communication with, said bore for directing an inflating gas against the interior of said sidewall to prevent rupture of the balloon during inflation.

References Cited in the file of this patent

UNITED STATES PATENTS

| | | |
|---|---|---|
| 576,052 | Grant | Jan. 26, 1897 |
| 2,663,968 | Longino | Dec. 29, 1953 |